United States Patent
Huang et al.

(10) Patent No.: US 11,447,366 B2
(45) Date of Patent: Sep. 20, 2022

(54) DETERMINATION FOR MOTION OF PASSENGER OVER ELEVATOR CAR

(71) Applicant: Otis Elevator Company, Farmington, CT (US)

(72) Inventors: Wenbo Huang, Shanghai (CN); Xiaofei Guo, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 1126 days.

(21) Appl. No.: 16/015,551

(22) Filed: Jun. 22, 2018

(65) Prior Publication Data

US 2018/0370761 A1 Dec. 27, 2018

(30) Foreign Application Priority Data

Jun. 23, 2017 (CN) .......................... 201710484948.2
May 10, 2018 (CN) .......................... 201810442855.8

(51) Int. Cl.

| | |
|---|---|
| B66B 1/46 | (2006.01) |
| H04W 76/10 | (2018.01) |
| B66B 1/34 | (2006.01) |
| H04W 4/06 | (2009.01) |
| H04B 17/318 | (2015.01) |
| H04W 4/80 | (2018.01) |
| H04W 88/02 | (2009.01) |

(52) U.S. Cl.
CPC ............ *B66B 1/468* (2013.01); *B66B 1/3461* (2013.01); *H04W 4/06* (2013.01); *H04W 76/10* (2018.02); *B66B 2201/103* (2013.01); *B66B 2201/4615* (2013.01); *B66B 2201/4638* (2013.01); *B66B 2201/4653* (2013.01); *H04B 17/318* (2015.01); *H04W 4/80* (2018.02); *H04W 88/02* (2013.01)

(58) Field of Classification Search
CPC ....................................................... H04W 4/80
See application file for complete search history.

(56) References Cited

U.S. PATENT DOCUMENTS

| | | |
|---|---|---|
| 4,979,594 A | 12/1990 | Begle et al. |
| 5,952,626 A | 9/1999 | Zaharia |
| 5,984,051 A | 11/1999 | Morgan et al. |

(Continued)

FOREIGN PATENT DOCUMENTS

| | | |
|---|---|---|
| CN | 202717457 U | 2/2013 |
| CN | 202808099 U | 3/2013 |

(Continued)

OTHER PUBLICATIONS

European Search Report for application EP 18179330.8, dated Nov. 27, 2018, 34 pages.

*Primary Examiner* — Wen W Huang
(74) *Attorney, Agent, or Firm* — Cantor Colburn LLP

(57) ABSTRACT

The present invention relates to the determination of the movement of a passenger relative to an elevator car and belongs to the field of elevator intelligent control technologies. The present invention acquires information about the movement of a passenger relative to an elevator car, wherein the information about the movement of the passenger relative to the elevator car is determined based on a change in the signal strength of a first wireless signal received by a personal mobile terminal carried by the passenger and a change in first floor information and/or traveling direction information.

32 Claims, 3 Drawing Sheets

(56) References Cited

U.S. PATENT DOCUMENTS

| | | | |
|---|---|---|---|
| 6,109,396 A | 8/2000 | Sirag et al. | |
| 6,202,799 B1 | 3/2001 | Drop | |
| 6,209,685 B1 | 4/2001 | Zaharia et al. | |
| 6,382,363 B1 | 5/2002 | Friedli | |
| 6,397,976 B1 | 6/2002 | Hale et al. | |
| 7,426,981 B2 | 9/2008 | Bacellar et al. | |
| 7,552,800 B2 | 6/2009 | Puskala et al. | |
| 8,485,317 B2 | 7/2013 | Gerstenkorn et al. | |
| 8,678,143 B2 | 3/2014 | Biinter et al. | |
| 2007/0041352 A1* | 2/2007 | Frankel | B66B 1/468 370/338 |
| 2011/0200023 A1* | 8/2011 | Murray | G01S 5/02 455/41.1 |
| 2016/0185568 A1* | 6/2016 | Kusserow | H04W 52/0203 340/3.31 |
| 2017/0013409 A1* | 1/2017 | Cerchio | H04W 72/0473 |
| 2017/0291792 A1* | 10/2017 | Scoville | B66B 1/3407 |
| 2019/0373530 A1* | 12/2019 | Witczak | H04W 40/20 |

FOREIGN PATENT DOCUMENTS

| | | |
|---|---|---|
| CN | 204057529 U | 12/2014 |
| CN | 204873294 U | 12/2015 |
| CN | 204897058 U | 12/2015 |
| CN | 204980676 U | 1/2016 |
| CN | 205472059 U | 8/2016 |
| CN | 106044421 A | 10/2016 |
| CN | 205855656 U | 1/2017 |
| CN | 205873545 U | 1/2017 |
| EP | 3116200 A2 | 1/2017 |
| JP | 2003204398 A | 7/2003 |
| JP | 2012062190 A | 3/2012 |
| WO | 2014178790 A1 | 11/2014 |
| WO | 17050785 A1 | 3/2017 |

\* cited by examiner

DETERMINATION FOR MOTION OF PASSENGER OVER ELEVATOR CAR

FOREIGN PRIORITY

This application claims priority to Chinese Patent Application No. 201810442855.8, filed May 10, 2018 and Chinese Patent Application No. 201710484948.2, filed Jun. 23, 2017, and all the benefits accruing therefrom under 35 U.S.C. § 119, the contents of which in its entirety are herein incorporated by reference.

TECHNICAL FIELD

The present invention belongs to the field of elevator intelligent control technologies, and relates to the determination of the movement of a passenger relative to an elevator car by utilizing wireless interaction between a wireless signal module mounted in the elevator car and a personal mobile terminal.

BACKGROUND ART

In an existing elevator system, one of the common modes of elevator calling operation is as follows: a passenger manually presses a certain elevator calling button on an elevator calling control panel mounted in an elevator landing area to input an elevator calling request command for traveling upwards or downwards, and then, after entering a certain elevator car, the passenger manually presses a certain floor button on a target floor registration control panel mounted in each elevator car to input a target floor. Such an elevator calling operation mode needs to be completed manually; moreover, especially when the passenger's hands are incapable of performing the above-mentioned button pressing operation freely (for example, the passenger is carrying stuff with both hands, or the passenger has difficulty in walking and is sitting in a wheelchair), the elevator calling operation becomes difficult, affecting the passenger's experience.

With the development of the automatic elevator calling operation technology, various techniques of automatically realizing elevator calling operations through smart mobile terminals such as cell phones emerge; however, ineffective elevator calling may be easily caused due to the uncertainty of action or movement of passengers.

SUMMARY OF INVENTION

According to a first aspect of the present invention, an automatic elevator calling system is provided, comprising: a first wireless signal module mounted in an elevator car and used for broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled", wherein the first wireless signal module is further used for receiving and determining information about the movement of a passenger relative to the elevator car, and the information about the movement is determined based on a change in the signal strength of the first wireless signal received by a personal mobile terminal carried by the passenger and a change in the first floor information and/or traveling direction information.

According to an apparatus of one embodiment of the present invention, the information about the movement comprises that the passenger has successfully moved into the elevator car and has successfully taken the elevator, which is determined in the following situation: the signal strength of the received first wireless signal changes from zero or relatively weak to equal to or greater than a relatively strong first pre-determined value, and the traveling direction information in the received first wireless signal changes from "not traveled" to "traveling upwards" or "traveling downwards".

According to the apparatus of one embodiment of the present invention, the information about the movement comprises that the passenger has failed to move into the elevator car or has failed to take the elevator, which is determined in the following situation: the signal strength of the received first wireless signal changes from zero or relatively weak to equal to or greater than a relatively strong first pre-determined value, and the traveling direction information in the first wireless signal received after the change remains "not traveled" or disappears.

According to the apparatus of one embodiment of the present invention, the information about the movement comprises that the passenger has successfully moved into the elevator car and has successfully taken the elevator, which is determined in the following situation: the signal strength of the received first wireless signal changes from zero or relatively weak to equal to or greater than a relatively strong first pre-determined value, and the first floor information in the first wireless signal received after the change changes.

According to the apparatus of one embodiment of the present invention, the information about the movement comprises that the passenger has failed to move into the elevator car or has failed to take the elevator, which is determined in the following situation: the signal strength of the received first wireless signal changes from zero or relatively weak to equal to or greater than a relatively strong first pre-determined value, and the first floor information in the first wireless signal received after the change does not change or disappears.

According to the apparatus of one embodiment of the present invention, the first wireless signal module is used for automatically establishing a first wireless connection with the personal mobile terminal based on the first wireless signal, and receiving a target floor registration command sent over from the personal mobile terminal when establishing the first wireless connection.

According to the apparatus of one embodiment of the present invention, the first wireless signal further comprises connection status information about the first wireless connection, wherein when the signal strength of the first wireless signal received by the personal mobile terminal is equal to or greater than a first pre-determined value, it correspondingly indicates that a distance from the personal mobile terminal to the first wireless signal module is smaller than or equal to a first distance threshold, and the first wireless connection is automatically established and the connection status information changes from "Off" to "On".

According to the apparatus of one embodiment of the present invention, the information about the movement comprises that the passenger has successfully moved into the elevator car and has successfully taken the elevator, which is determined in the following situation: the received connection status information about the first wireless connection changes from "Off" to "On", and the traveling direction information in the first wireless signal received after the change changes from "not traveled" to "traveling upwards" or "traveling downwards".

According to the apparatus of one embodiment of the present invention, the information about the movement comprises that the passenger has failed to move into the elevator car or has failed to take the elevator, which is determined in the following situation: the received connection status information about the first wireless connection changes from "Off" to "On", and the traveling direction information in the first wireless signal received after the change remains "not traveled" or disappears.

According to the apparatus of one embodiment of the present invention, the information about the movement comprises that the passenger has successfully moved into the elevator car and has successfully taken the elevator, which is determined in the following situation: the received connection status information about the first wireless connection changes from "Off" to "On", and the first floor information in the first wireless signal received after the change changes.

According to the apparatus of one embodiment of the present invention, the information about the movement comprises that the passenger has failed to move into the elevator car or has failed to take the elevator, which is determined in the following situation: the received connection status information about the first wireless connection changes from "Off" to "On", and the first floor information in the first wireless signal received after the change does not change or disappears.

According to the apparatus of one embodiment of the present invention, the apparatus further comprises: a second wireless signal module mounted in an elevator landing area, which is used for broadcasting a second wireless signal and automatically establishing a second wireless connection with the personal mobile terminal based on the second wireless signal, and receiving an elevator calling request command regarding an elevator calling direction sent over from the personal mobile terminal when establishing the second wireless connection.

According to the apparatus of one embodiment of the present invention, the first wireless signal module is further used for receiving movement result information about whether the passenger has correspondingly moved into a designated elevator car, and the movement result information is determined based on comparison of the traveling direction information in the first wireless signal received by the personal mobile terminal with the elevator calling direction in the elevator calling request command sent out by the personal mobile terminal.

According to the apparatus of one embodiment of the present invention, the movement result information is that the passenger has failed to move into the designated elevator car, which is determined in the following situation: the traveling direction information in the received first wireless signal is inconsistent with the elevator calling direction in the elevator calling request command sent out by the personal mobile terminal.

According to the apparatus of one embodiment of the present invention, the first wireless signal further comprises identity information corresponding to the first wireless signal module or the elevator car on which it is mounted; and the first wireless signal module is further used for receiving movement result information about whether the passenger has correspondingly moved into a designated elevator car, and the movement result information is determined based on comparison of the identity information in the first wireless signal received by the personal mobile terminal with the identity information about the elevator car designated for the personal mobile terminal.

According to the apparatus of one embodiment of the present invention, the movement result information is that the passenger has failed to move into the designated elevator car, which is acquired in the following situation: the identity information in the received first wireless signal is inconsistent with the identity information about the elevator car designated for the personal mobile terminal.

According to the apparatus of one embodiment of the present invention, the second wireless signal module and/or the first wireless signal module are/is bluetooth low energy modules/a bluetooth low energy module.

According to a second aspect of the present invention, an elevator system is provided, comprising: the automatic elevator calling system according to any one of the above paragraphs; and an elevator controller for controlling running of one or more elevator cars in the elevator system.

According to the elevator system of one embodiment of the present invention, the elevator controller is configured to judge, based on the information about the movement, whether to cancel a target floor registration command registered in the elevator car and corresponding to the personal mobile terminal of the passenger.

According to a third aspect of the present invention, a method for determining the movement of a passenger relative to an elevator car is provided, comprising: receiving a first wireless signal, wherein the first wireless signal is broadcast from the elevator car and is a data signal comprising first floor information about where the elevator car is currently located and/or current traveling direction information about the elevator car, wherein the traveling direction information comprises: "traveling upwards", "traveling downwards" and "not traveled"; determining the signal strength of the received first wireless signal; and determining the movement of the passenger relative to the elevator car based on a change in the signal strength of the received first wireless signal and the first floor information and a change in the first floor information and/or traveling direction information.

According to the method of one embodiment of the present invention, in the step of determining the movement, it is determined that the passenger has successfully moved into the elevator car and has successfully taken the elevator when the signal strength of the received first wireless signal changes from zero or relatively weak to equal to or greater than a relatively strong first pre-determined value and the traveling direction information in the received first wireless signal changes from "not traveled" to "traveling upwards" or "traveling downwards".

According to the method of one embodiment of the present invention, in the step of determining the movement, it is determined that the passenger has failed to move into the elevator car or has failed to take the elevator when the signal strength of the received first wireless signal changes from zero or relatively weak to equal to or greater than a relatively strong first pre-determined value and the traveling direction information in the first wireless signal received after the change remains "not traveled" or disappears.

According to the method of one embodiment of the present invention, in the step of determining the movement, it is determined that the passenger has successfully moved into the elevator car and has successfully taken the elevator when the signal strength of the received first wireless signal changes from zero or relatively weak to equal to or greater than a relatively strong first pre-determined value and the first floor information in the first wireless signal received after the change changes.

According to the method of one embodiment of the present invention, in the step of determining the movement, it is determined that the passenger has failed to move into the elevator car or has failed to take the elevator when the signal strength of the received first wireless signal changes from zero or relatively weak to equal to or greater than a relatively strong first pre-determined value and the first floor information in the first wireless signal received after the change does not change or disappears.

According to the method of one embodiment of the present invention, the signal strength of the first wireless signal changing from zero or relatively weak to equal to or greater than a relatively strong first pre-determined value refers to approximately gradually changing from zero or relatively weak to equal to or greater than the relatively strong pre-determined value.

According to the method of one embodiment of the present invention, the first wireless signal further comprises connection status information about a first wireless connection used for sending a target floor registration command, wherein the first wireless connection is automatically established and the connection status information changes from "Off" to "On" when the signal strength of the received first wireless signal is equal to or greater than a first pre-determined value.

According to the method of one embodiment of the present invention, in the step of determining the movement, it is determined that the passenger has successfully moved into the elevator car and has successfully taken the elevator when the received connection status information about the first wireless connection changes from "Off" to "On" and the traveling direction information in the first wireless signal received after the change changes from "not traveled" to "traveling upwards" or "traveling downwards".

According to the method of one embodiment of the present invention, in the step of determining the movement, it is determined that the passenger has failed to move into the elevator car or has failed to take the elevator when the received connection status information about the first wireless connection changes from "Off" to "On" and the traveling direction information in the first wireless signal received after the change remains "not traveled" or disappears.

According to the method of one embodiment of the present invention, in the step of determining the movement, it is determined that the passenger has successfully moved into the elevator car and has successfully taken the elevator when the received connection status information about the first wireless connection changes from "Off" to "On" and the first floor information in the first wireless signal received after the change changes.

According to the method of one embodiment of the present invention, in the step of determining the movement, it is determined that the passenger has failed to move into the elevator car or has failed to take the elevator when the received connection status information about the first wireless connection changes from "Off" to "On" and the first floor information in the first wireless signal received after the change does not change or disappears.

According to the method of one embodiment of the present invention, the method further comprises a step of: when it is determined that the passenger has failed to move into the elevator car or has failed to take the elevator, actively establishing a fourth wireless connection with a corresponding second wireless signal module mounted in an elevator landing area so as to send a determination result that the passenger has failed to move into the elevator car or has failed to take the elevator.

According to the method of one embodiment of the present invention, in the step of determining the movement, the traveling direction information in the received first wireless signal is compared with the elevator calling direction in an elevator calling request command sent out by the passenger, and if the traveling direction information in the received first wireless signal is inconsistent with the elevator calling direction in the elevator calling request command sent out by the passenger, it is determined that the passenger has failed to move into a designated elevator car.

According to the method of one embodiment of the present invention, the first wireless signal further comprises identity information corresponding to the elevator car; and in the step of determining the movement, the received identity information is compared with identity information about a designated elevator car, and if the received identity information in the first wireless signal is inconsistent with the identity information about the designated elevator car, it is determined that the passenger has failed to move into the designated elevator car.

According to the method of one embodiment of the present invention, the method further comprises: when it is determined that the passenger has failed to move into the elevator car or has failed to take the elevator, actively establishing a third wireless connection with a corresponding first wireless signal module so as to send a determination result that the passenger has failed to move into the designated elevator car.

According to a fourth aspect of the present invention, a computer device is provided, comprising: a memory, a processor and a computer program that is stored in the memory and can run on the processor, wherein the processor realizes steps of the method according to any of the above paragraphs when executing the program.

According to a fifth aspect of the present invention, a computer readable storage medium is provided, with a computer program stored thereon, wherein the program can be executed by a processor to realize steps of the method according to any of the above paragraphs.

According to a sixth aspect of the present invention, a method for determining the movement of a passenger relative to an elevator car is provided, comprising: a first wireless signal module mounted in the elevator car broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled"; and receiving information about the movement of the passenger relative to an elevator landing area, wherein the information about the movement is determined based on a change in the signal strength of the first wireless signal received by a personal mobile terminal carried by the passenger and a change in the first floor information and/or traveling direction information.

According to a seventh aspect of the present invention, an apparatus for determining the movement of a passenger relative to an elevator car is provided, wherein the apparatus determines, through a personal mobile terminal carried by the passenger, the signal strength of a first wireless signal received by the personal mobile terminal and broadcast by a first wireless signal module mounted in the elevator car;

and the apparatus comprises: a movement determination module for determining information about the movement of the passenger relative to the elevator car based on a change in the signal strength of the received first wireless signal and the first floor information and a change in first floor information and/or traveling direction information, wherein the first wireless signal is a data signal comprising the first floor information about where the elevator car is currently located and/or the current traveling direction information about the elevator car, wherein the traveling direction information comprises: "traveling upwards", "traveling downwards" and "not traveled"; According to an eighth aspect of the present invention, an elevator system is provided, comprising: a first wireless signal module mounted in an elevator car and used for broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled"; and the apparatus for determining the movement of a passenger relative to an elevator car according to any one of the above paragraphs.

According to the description and accompanying drawings below, the above features and operations of the present invention will become more obvious.

BRIEF DESCRIPTION OF THE DRAWINGS

The detailed description below in conjunction with the accompanying drawings will make the above-mentioned and other objects and advantages of the present invention more complete and clearer, wherein identical or similar elements are expressed with identical labels.

DETAILED DESCRIPTION

The present invention will now be described more completely with reference to the accompanying drawings, where exemplary embodiments of the present invention are shown. However, the present invention can be implemented in many different forms and should not be understood as being limited to the embodiments elaborated here. On the contrary, these embodiments are provided so that the present disclosure becomes more thorough and complete, and fully conveys the concept of the present invention to a person skilled in the art.

Some block diagrams shown in the accompanying drawings are functional entities and are not necessarily corresponding to physically or logically independent entities. These functional entities may be implemented in the form of software, in one or more hardware modules or integrated circuits, or in different processor apparatuses and/or microcontroller apparatuses.

For the convenience of description, the "apparatus for determining the movement of a passenger relative to an elevator car" is abbreviated as the "movement determination device" herein, and the "method for determining the movement of a passenger relative to an elevator car" is abbreviated as the "movement determination method".

Figure 1:
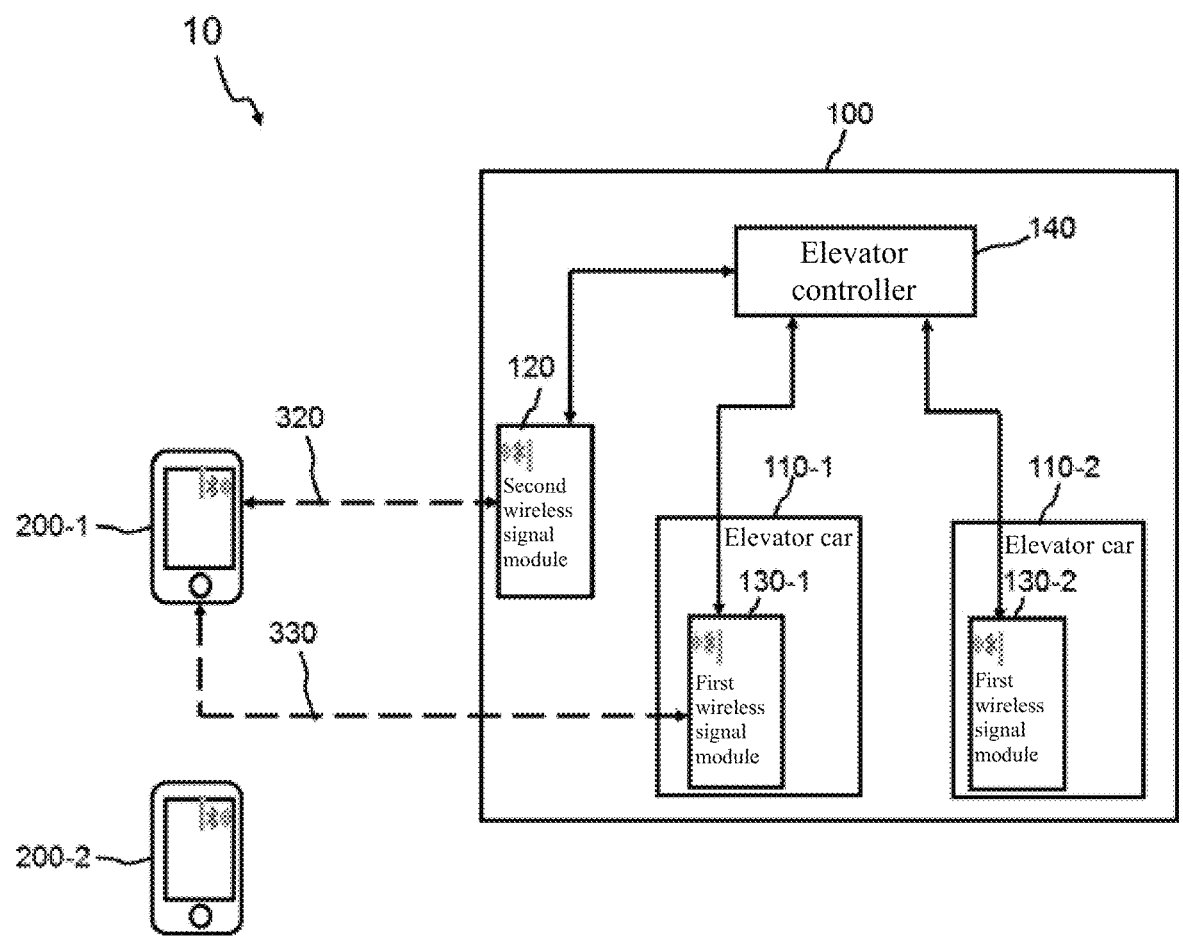
FIG. 1 is a schematic diagram of an automatic elevator calling system according to one embodiment of the present invention, in which an elevator system of one embodiment of the present invention is also shown.
Figure 2:
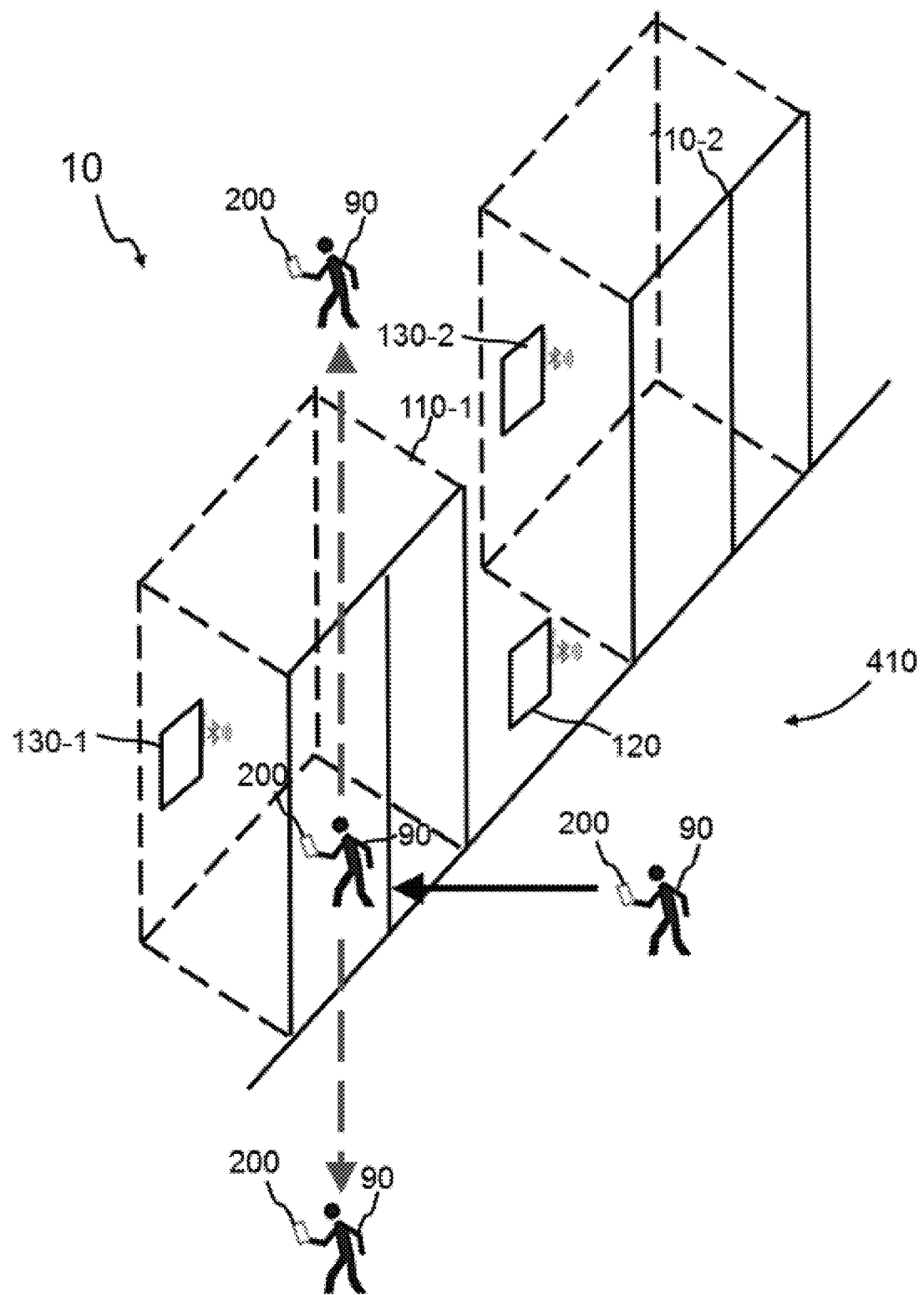
FIG. 2 is a schematic diagram of an application scenario of a movement determination apparatus according to one embodiment of the present invention.
Figure 3:
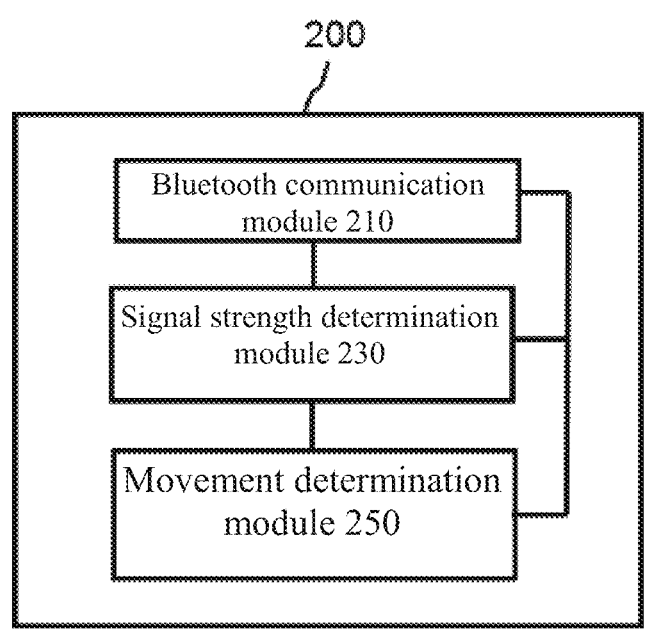
FIG. 3 shows a schematic structural diagram of modules of a personal mobile terminal when the movement determination apparatus of one embodiment of the present invention is at least partially implemented in the personal mobile terminal.

FIG. 1 shows a schematic diagram of an automatic elevator calling system according to one embodiment of the present invention; FIG. 2 shows a schematic diagram of an application scenario of a movement determination apparatus according to one embodiment of the present invention; and FIG. 3 shows a schematic structural diagram of modules of a personal mobile terminal of one embodiment of the present invention. Exemplary explanation is made to the movement determination apparatus, the automatic elevator calling system and the elevator system of the embodiments of the present invention below in conjunction with FIG. 1 and FIG. 3, and at the same time exemplary explanation is made to the method for determining the movement of a passenger relative to an elevator car.

The movement determination apparatus 10 of the embodiment of the present invention is implemented in an automatic elevator calling system of an embodiment shown in FIG. 1, so as to constitute the automatic elevator calling system of one embodiment of the present invention. The automatic elevator calling system is further applied in an elevator system 100 mounted in a building, and the elevator system 100 includes one or more elevator cars 110 traveling upwards and downwards in hoistways of the building. FIG. 1 shows two of the elevator cars of the elevator system 100, i.e., 110-1 and 110-2. The traveling or stopping of each elevator car 110 in the hoistways, namely each elevator car 110, is controlled by an elevator controller 140 in the elevator system 100, the particular control mode or control principle of the elevator controller 140 over one or more elevator cars 110 is not restrictive, and the particular structure or arrangement manner, etc. of the elevator controller 140 is not restrictive either.

It will be understood that the parts or modules included in the movement determination apparatus 10 of the following embodiment of the present invention may be included in the automatic elevator calling system of one embodiment of the present invention. For example, the automatic elevator calling system includes a first wireless signal module 130 and/or a second wireless signal module 120.

Again as shown in FIG. 1 and FIG. 2, the movement determination apparatus 10 includes one or more first wireless signal modules 130, and each first wireless signal module 130 is mounted in each elevator car 110. For example, one first wireless signal module 130-1 is arranged in the elevator car 110-1, and one first wireless signal module 130-2 is arranged in the elevator car 110-2. In one embodiment, the first wireless signal module is mounted on a target floor registration control panel in the elevator car 110 and is arranged on the target floor registration control panel by way of integration. The particular integration and arrangement manner of the first wireless signal module 130 with regard to the target floor registration control panel is not restrictive.

The first wireless signal module 130, in particular, can be a Bluetooth Low Energy (BLE) module, and correspondingly, the first wireless signal module 130 transmits or broadcasts a first wireless signal, e.g., a Bluetooth low energy signal, and the signal strength of the broadcast first wireless signal attenuates with the broadcasting distance thereof, and the particular way of attenuation thereof is not restrictive. The first wireless signal broadcast by the first wireless signal module 130 can roughly effectively cover the area in the elevator car 110 where it is mounted, and the first wireless signal can, for example, correspondingly be a bluetooth low energy signal, which can include a data signal of the first floor information about where the elevator car 110 is currently located.

It should be noted that the first wireless signal module 130 is coupled to the elevator controller 140; therefore, during the running of each elevator car 110, the first wireless signal module 130 is able to acquire desired information from the elevator controller 140 in real time, e.g., current first floor information, traveling direction information, etc. of the elevator car 110, and the first floor information and/or traveling direction information (the traveling direction information includes, for example, "traveling upwards", "traveling downwards" and "not traveled") is, for example, packaged into a bluetooth data signal and is broadcast in the form of a first bluetooth signal.

Again as shown in FIG. 1 to FIG. 3, the movement determination apparatus 10 can further be at least partially implemented through a personal mobile terminal 200 carried by a passenger 90, and the personal mobile terminals 200-1 and 200-2 respectively carried by two passengers can both respectively implement at least some functions of the movement determination apparatus 10. Each personal mobile terminal 200 is configured to be able to receive a first wireless signal broadcast by the first wireless signal module 130 when the distance condition is satisfied. As shown in FIG. 3, a wireless communication module 210 in the personal mobile terminal 200 is used to receive a first wireless signal or other wireless signals, and the wireless communication module 210 can particularly be a Bluetooth low energy module. Here, the first wireless signal can be a data signal including first floor information about where the elevator car 110 is currently located and/or current traveling direction information about the elevator car 110.

Each personal mobile terminal 200 can determine the signal strength of the first wireless signal received thereby, and in one embodiment, the signal strength determination module 230 in the personal mobile terminal 200 determines the signal strength of the received first wireless signal based on the first wireless signal. For example, the personal mobile terminal 200 is configured with a received signal strength indicator (RSSI) for determining the signal strength of the first wireless signal or any other wireless signals received thereby, that is to say, the signal strength determination module 230 is realized through the RSSI.

It should be understood that the signal strength of the first wireless signal received by the personal mobile terminal 200 is relevant to a pre-set effective broadcast distance of the first wireless signal or the strength of the broadcast signal. In one embodiment, the effective broadcast distance of a first wireless signal is pre-set. For example, when the distance from the personal mobile terminal 200 to the first wireless signal module 130 is smaller than or equal to 0.7 to 1 meter, the signal strength of the first wireless signal received by the personal mobile terminal 200 will be equal to or greater than a first pre-determined value, and the RSSI can indicate the signal strength of the first wireless signal as "strong", with an effective broadcast distance correspondingly being 0.7 to 1 meter. Therefore, for the passenger 90 in the elevator car 110, the personal mobile terminal 200 carried thereby can receive a relatively "strong" first wireless signal and can also obtain first floor information broadcast in the first wireless signal at the same time; that is to say, the personal mobile terminal 200 of the passenger 90 can acquire the first floor information about the current elevator car in real time.

In one embodiment of the present invention, a movement determination module 250 of the personal mobile terminal 200 is used for determining the movement of the passenger 90 relative to the elevator car 110 based on a change in the signal strength of the received first wireless signal and the first floor information, and a change in the first floor information and/or traveling direction information.

It should be noted that it is of great meaning to determine the movement of the passenger 90 relative to the elevator car 110. This is because with the development of the intelligent control technology for elevators, the personal mobile terminal 200 carried by the passenger 90 is a smart terminal that can realize an automatic elevator calling operation, which can automatically send out various types of elevator calling operation commands, enabling the elevator controller to perform scheduling and control over the elevator car; for example, the automatic registration of a target floor in an elevator car is automatically realized, and the elevator controller will control the running of the elevator car based on the automatically registered target floor. However, the elevator controller does not know whether the passenger 90 has indeed entered the elevator car, or whether the passenger has entered a designated elevator car correctly. If the target floor corresponding to the passenger 90 is automatically registered, but the passenger 90 has not successfully entered the elevator car or has not successfully taken the elevator, then the elevator car 110 is likely to be in ineffective operation, seriously affecting the operation efficiency of the elevator system.

As shown in FIG. 2, the elevator car 110 travels upwards or downwards to a floor N and stops at the floor N, with the floor N for example corresponding to an elevator landing area 410, and the passenger 90 carrying the personal mobile terminal 200 is waiting for the elevator in the elevator landing area 410 or is moving in the elevator landing area 410; if the elevator car 110-1 is the elevator car that he/she wants to enter or is notified to be the elevator car designated by the elevator system 100, when the landing door of the elevator car 110-1 is open, a first wireless signal broadcast by a first wireless signal module 130-1 in the elevator car 110-1 will be able to be received by the personal mobile terminal 200 (if the passenger is close enough to the landing door of the elevator car 110-1); moreover, as the passenger 90 moves towards the inside of the elevator car 110-1, the signal strength of the first wireless signal (broadcast by the first wireless signal module 130-1) received by the personal mobile terminal 200 will gradually become stronger, for example, changing from zero or relatively weak to equal to or greater than a relatively strong first pre-determined value; the first pre-determined value can indicate that, when the current distance from the passenger 90 to the first wireless signal module 130-1 is within the range of 0.7 to 1 meter, if the signal strength is equal to or greater than the first pre-determined value, the passenger 90 is likely to be located in the elevator car 110-1, and if the signal strength is smaller than or equal to the first pre-determined value, the passenger 90 is likely to be located in the elevator landing area 410.

Therefore, in one embodiment, the first wireless signal module 130-1 keeps broadcasting the first floor information through the first wireless signal, e.g., a floor N (if the elevator stops at the Nth floor); and the personal mobile terminal 200 will be able to receive the first floor information (for example, the floor N), and at the same time the personal mobile terminal 200 determines the signal strength of the received first wireless signal through the RSSI, etc. If the signal strength of the first wireless signal received by the personal mobile terminal 200 changes from zero or relatively weak to equal to or greater than a relatively strong first pre-determined value, and the first floor information in the first wireless signal received by the personal mobile terminal 200 after the change changes, for example changing to a floor (N−1) or floor (N+1), it is determined that the passenger 90 has successfully moved into the elevator car 110-1 and has successfully taken the elevator.

If the signal strength of the first wireless signal received by the personal mobile terminal 200 changes from zero or relatively weak to equal to or greater than a relatively strong first pre-determined value, and the first floor information in the first wireless signal received by the personal mobile terminal 200 after the change remains unchanged or disappears, for example, remaining at the floor N for at least 3 to 10 seconds, which is likely to be the case where the passenger 90 is near the landing door of the elevator car 110-1 but has not entered the elevator car (for example, when too many passengers are in the elevator car 110-1 and it is difficult to enter the elevator car), or for example the first floor information having disappeared, which is likely to be the case where the elevator car 110-1 travels and leaves the floor N but the passenger is still in the elevator landing area 410, it is determined that the passenger 90 has failed to move into the elevator car 110-1 or has failed to take the elevator. As exemplary explanation, there are such as the following two cases where the passenger 90 fails to move into the elevator car 110-1 or fails to take the elevator in the practical process of taking an elevator: first, the passenger 90 intentionally or unintentionally moves to the vicinity of the landing door but has not successfully moved into the elevator car 110; and second, the passenger 90 steps into the elevator car 110 but temporarily changes his/her mind and returns back to the elevator landing area 410 for the reason such as the crowdedness in the elevator car 100.

In one embodiment, the personal mobile terminal 200 or the movement determination module 250 thereof is further configured to: determine that the passenger 90 has successfully moved into the elevator car 110 and has successfully taken the elevator when the signal strength of the first wireless signal received thereby changes from zero or relatively weak to equal to or greater than a relatively strong first pre-determined value and the first floor information in the first wireless signal received thereby after the change changes; and the personal mobile terminal 200 or the movement determination module 250 thereof is further configured to: determine that the passenger 90 has failed to move into the elevator car 110 and has failed to take the elevator when the signal strength of the first wireless signal received thereby changes from zero or relatively weak to equal to or greater than a relatively strong first pre-determined value and the first floor information in the first wireless signal received thereby after the change does not change or disappears.

In the movement determination process or the movement determination method, whether the passenger has moved towards the elevator car 110 can be determined through the change in the signal strength of the received first wireless signal, and whether the passenger is traveling together with the first elevator car 110 can be determined through the change in the first floor information in the first wireless signal received subsequently; thus, it can be determined that the passenger has successfully moved into the elevator car 110 or whether the passenger has successfully taken the elevator. The above first floor information in the first wireless signal received after the change is received when the RRSI indicates "strong", i.e., when the signal strength remains equal to or greater than the first pre-determined value, which further indicates that the passenger 90 is receiving the changed first floor information inside the elevator car 110.

Again as shown in FIG. 1 to FIG. 3, in another embodiment, the first wireless signal module 130 is coupled to the elevator controller 140; and during the running of each elevator car 110, the first wireless signal module 130 can acquire traveling direction information about the elevator car 110 from the elevator controller 140 in real time. For example, when the elevator is traveling upwards, the traveling direction information is "traveling upwards", when the elevator is traveling downwards, the traveling direction information is "traveling downwards", and when the elevator stops at a certain floor, the traveling direction information is "not traveled"; moreover, the traveling direction information is packaged into a wireless data signal and is broadcast in the form of a first wireless signal.

The personal mobile terminal 200 or the movement determination module 250 thereof is configured to: determine the movement of the passenger 90 relative to the elevator car 110 based on the change in the signal strength of the received first wireless signal, and also determine whether the passenger has successfully moved into the elevator car and has successfully taken the elevator based on the change in the traveling direction information in the received first wireless signal. In one embodiment, the personal mobile terminal 100 or the movement determination module 250 thereof is further configured to: determine that the passenger 900 has successfully moved into the elevator car 110 and has successfully taken the elevator when the signal strength of the first wireless signal received thereby changes from zero or relatively weak to equal to or greater than a relatively strong first pre-determined value and the traveling direction information in the first wireless signal received thereby changes from "not traveled" to "traveling upwards" or "traveling downwards". The personal mobile terminal 100 or the movement determination module 250 thereof is further configured to: determine that the passenger 90 has failed to move into the elevator car 110 and has failed to take the elevator when the signal strength of the first wireless signal received thereby changes from zero or relatively weak to equal to or greater than a relatively strong first pre-determined value and the traveling direction information in the first wireless signal received thereby after the change remains "not traveled" or disappears.

In the movement determination process or the movement determination method, whether the passenger has moved towards the elevator car 110 can be determined through the change in the signal strength of the received first wireless signal, and whether the passenger is traveling together with the first elevator car 110 can be determined through the change in the first floor information in the first wireless signal received subsequently; thus, it can be determined that the passenger has successfully moved into the elevator car 110 or whether the passenger has successfully taken the elevator. The above first floor information in the first wireless signal received after the change is received when the RRSI indicates "strong", i.e., when the signal strength remains equal to or greater than the first pre-determined value, which further indicates that the passenger 90 is receiving the changed traveling direction information inside the elevator car 110.

Since the change in the traveling direction information is earlier than the change in the first floor information and is easy to be recognized earlier by the personal mobile terminal 100 in the process from stopping of the elevator car 110 to starting to travel, it is more timely or more effective to determine the movement of the passenger relative to the elevator car based on the change in the signal strength of the received first wireless signal and the change in the traveling direction information compared with determining the movement of the passenger relative to the elevator car based on the change in the signal strength of the received first wireless signal and the change in the first floor information.

In the above embodiment, when the passenger 90 walks to approach the first wireless signal module 130, the change in the signal strength of the first wireless signal received by the personal mobile terminal 200 increases approximately progressively; therefore, in the process where the signal strength of the above-mentioned first wireless signal changes from zero or relatively weak to equal to or greater than a relatively strong first pre-determined value, the signal strength can be chosen to change approximately progressively, for example, changing approximately linearly or changing in an approximately curved manner. As such, the situations that do not indicate the passenger 90 moving towards the elevator car 110, such as the signal strength "suddenly changing", can be excluded, increasing the accuracy of judgement.

It should be noted that the first pre-determined value is chosen to represent a signal strength value of a first wireless signal received by a personal mobile terminal 200 when a passenger is or is likely to be in the elevator car, for example the signal strength value of the first wireless signal received by the personal mobile terminal 200 when a distance from the corresponding passenger 90 to the first wireless signal module 130 is at a certain value within the range of 0.7 to 1 meter, or the signal strength value of the first wireless signal received by the personal mobile terminal 200 when the corresponding passenger 90 is in the elevator car 110. When the landing door of the elevator car 110 opens and the passenger 90 is standing at the position of the landing door or is very close to the landing door (for example, distanced within 0.3 meter from the landing door), the signal strength of the first wireless signal received thereby is likely to be equal to or greater than the first pre-determined value. Generally, when the landing door closes, the personal mobile terminal 200 outside the elevator car 110 cannot receive the corresponding first wireless signal or receives a weak first wireless signal.

In the present application, the signal strength of the first wireless signal being weak refers to that the signal strength of the first wireless signal is at least smaller than the first pre-determined value.

Again as shown in FIG. 1 and FIG. 2, in one embodiment, the movement determination apparatus 10 further includes a second wireless signal module 120 mounted in each elevator landing area 410, for broadcasting a second wireless signal, for example, keeping broadcasting a data signal including second floor information about the elevator landing area 410 where the second wireless signal module 120 is located; as such, the personal mobile terminal 200 can keep receiving the second floor information once entering the elevator landing area 410.

The movement determination apparatus 10 of the embodiments of the present invention can be applied to an elevator system 100 described below that can automatically complete an elevator calling operation in a completely hand free mode according to the embodiments of the present invention and can effectively avoid ineffective elevator calling operations.

As shown in FIG. 1 and FIG. 2, in order to acquire an elevator calling request command from each elevator landing area 410, a second wireless signal module 120 is arranged in the elevator system 100, and the second wireless signal module 120 can be mounted in each elevator landing area 410 of the elevator system 100 (as shown in FIG. 2). It should be understood that each elevator landing area 410 can be mounted with one or more second wireless signal modules 120, so that the second wireless signal sent out by the second wireless signal module 120 can approximately effectively cover each elevator landing area 410. The second wireless signal module 120 can particularly be arranged in an elevator calling control panel of the elevator system 100 by way of integration, wherein the elevator calling control panel 12 is generally mounted at two sides of the landing door of the elevator landing area 410, and the elevator calling control panel 12 can be arranged with for example an "upward" or "downward" elevator calling button, so as to be also able to realize the manual input of an elevator calling request command based on the elevator calling control panel 12.

In one embodiment, the second wireless signal module 120 can particularly be a bluetooth low energy (BLE) module; and the second wireless signal can for example correspondingly be a BLE signal, which can include a wake-up signal for waking up the personal mobile terminal 200, and can also include identity (for example, a universally unique identifier (UUID)) of the second wireless signal module 120. The particular signal form of the second wireless signal is not restrictive. Similarly, the signal strength of the second wireless signal attenuates with the broadcast distance thereof, and therefore, the personal mobile terminal 200 that receives the second wireless signal can approximately determine the distance from the personal mobile terminal 200 to the second wireless signal module 120 according to the signal strength of the second wireless signal. It will be understood that, with the passenger walking in the elevator landing area 410, the distance dynamically changes.

Again as shown in FIG. 1 and FIG. 2, the elevator system 100 further includes multiple first wireless signal modules 130, and each first wireless signal module 130 is mounted in each elevator car 110. For example, one first wireless signal module 130-1 is arranged in the elevator car 110-1, and one first wireless signal module 130-2 is arranged in the elevator car 110-2. In one embodiment, the first wireless signal module is mounted on a target floor registration control panel in the elevator car 110 and is arranged on the target floor registration control panel by way of integration.

It should be noted that each second wireless signal module 120 and first wireless signal module 130 in the movement determination apparatus 10 or the elevator system 100 are coupled to an elevator controller 140. For example, they are indirectly coupled (for example, through an RSL bus connection) to the elevator controller 140 respectively through the elevator calling control panel and the target floor registration control panel; therefore, the elevator calling request command and the target floor registration command respectively received by the second wireless signal module 120 and the first wireless signal module 130 can be transmitted to the elevator controller 140.

Again as shown in FIG. 1, there may be a plurality of personal mobile terminals 200 carried by passengers 90 in the movement determination apparatus 10 or the elevator system 100, for example, personal mobile terminals 200-1 and 200-2 respectively carried by two passengers. Each personal mobile terminal 200 can establish a second wireless connection 320 with the second wireless signal module 120, and each personal mobile terminal 200 can establish a first wireless connection 330 with the first wireless signal module 130.

Again as shown in FIG. 1 to FIG. 3, the personal mobile terminal 200 can be various smart terminals with a wireless connection function that are convenient for passengers to carry; the personal mobile terminal 200 can be provided with a memory, a processor with computing function, etc., and in particular, the personal mobile terminal 200 can be a smart phone, a wearable smart device (e.g., a smart wristband), a personal digital assistant (PDA), etc., on which a corresponding application program (e.g., an APP) can be mounted to realize its function.

In the elevator system 100, when the second wireless signal module 120 broadcasts a second wireless signal, a personal mobile terminal 200 carried by a passenger near the second wireless signal module 120 will be able to automatically receive the second wireless signal, and based on the second wireless signal, the personal mobile terminal 200 automatically establishes a second wireless connection 320 with the corresponding second wireless signal module 120; moreover, when establishing the second wireless connection 320, the personal mobile terminal 200 sends an elevator calling request command regarding an elevator calling direction (e.g., an "upward" or "downward" elevator calling request command), the second wireless signal module 120 receives the elevator calling request command regarding the elevator calling direction sent over from the personal mobile terminal 200, and the second wireless signal module 120 can further send the elevator calling request command to the elevator controller 140, so that the elevator controller 140 controls the running of one or more elevator cars 110 in the elevator system 100 based on the elevator calling request command. As such, the elevator calling request command automatically sent by the personal mobile terminal 200 can replace the elevator calling request command input by manually pressing an elevator calling button; moreover, the above process can be automatically realized without the need for the passenger to operate the personal mobile terminal 200, completely realizing the automatic input of an elevator calling request command into the elevator system 100 by the passenger in a hand free mode. The implementation process is simple and convenient, greatly improving the passenger's experience.

It should be noted that each second wireless signal module 120 establishes a second wireless connection 320 with only one personal mobile terminal 200 at a certain moment, and each second wireless signal module 120 can successively establish a second wireless connection 320 with personal mobile terminals 200 carried by a plurality of passengers near the second wireless signal module 120. After establishing a second wireless connection 320 with the second wireless signal module 120 and sending a corresponding elevator calling request command, each personal mobile terminal 200 will actively disconnect the second wireless connection 320 so as to make preparation for the automatic establishment of a second wireless connection 320 between the second wireless signal module 120 and the personal mobile terminal 200 of the next passenger. In one embodiment, the second wireless signal module 120 is configured to return a second confirmation message to a corresponding personal mobile terminal 200 after receiving an elevator calling request command, and the second confirmation message indicates that the elevator calling request command is successfully accepted by the elevator system 100; and the personal mobile terminal 200 is configured to actively disconnect the second wireless connection 320 based on the received second confirmation message.

It should be noted that the "elevator calling request command regarding an elevator calling direction" in the present invention does not contain the target floor information about the passenger, or the target floor information is not recognized or used by the elevator controller 140 even if it is contained. Therefore, in the embodiments of the present invention, a first wireless connection 330 with the personal mobile terminal 200 is also established in dependence on the first wireless signal module 130.

Again as shown in FIG. 1, in the elevator system 100 or the movement determination apparatus 10, when the first wireless signal module 130 broadcasts a first wireless signal, a personal mobile terminal 200 carried by a passenger 90 near the first wireless signal module 130 (for example, when the passenger 90 moves towards the interior of the elevator car) will continue to be able to automatically receive the first wireless signal (at this moment, the second wireless connection 320 previously established between the personal mobile terminal 200 and the second wireless signal module 120 has already been disconnected), and based on the first wireless signal, the personal mobile terminal 200 automatically establishes a first wireless connection 330 with the corresponding first wireless signal module 130; moreover, when establishing the first wireless connection 330, the personal mobile terminal 200 sends a target floor registration command about target floor information, the first wireless signal module 130 receives an elevator calling request command regarding an elevator calling direction sent over from the personal mobile terminal 200, and the first wireless signal module 130 can further send the target floor registration command to the elevator controller 140, so that the elevator controller 140 controls the running of one or more elevator cars 110 in the elevator system 100 based on the target floor registration command. As such, the target floor registration command automatically sent by the personal mobile terminal 200 can replace the target floor registration command input by manually pressing a floor button; moreover, the above process can be automatically realized without the need for the passenger to operate the personal mobile terminal 200, completely realizing the automatic input of a target floor registration command into the elevator system 100 by the passenger in a hand free mode. The implementation process is simple and convenient, greatly improving the passenger's experience.

It should be noted that each first wireless signal module 130 establishes a first wireless connection 330 with only one personal mobile terminal 200 at a certain moment, and each first wireless signal module 130 can successively establish a first wireless connection 330 with personal mobile terminals 200 carried by a plurality of passengers 90 near the first wireless signal module 130. After establishing a first wireless connection 330 with the first wireless signal module 130 and sending a corresponding target floor registration command, each personal mobile terminal 200 will actively disconnect the first wireless connection 330 so as to make preparation for the establishment of a first wireless connection 330 between the first wireless signal module 130 and the personal mobile terminal 200 of the next passenger 90. In one embodiment, the first wireless signal module 130 is configured to return a first confirmation message to a corresponding personal mobile terminal 200 after receiving the target floor registration command, and the first confirmation message indicates that the target floor registration command is successfully accepted by the elevator system 100; and the personal mobile terminal 200 is configured to actively disconnect the first wireless connection 330 based on the received first confirmation message.

It should be understood that the above-mentioned process from establishing a second wireless connection 320 to disconnecting the second wireless connection 320 can be completed in a short time, and likewise, the above-mentioned process from establishing a first wireless connection 330 to disconnecting the first wireless connection 330 can also be completed in a short time, for example in a time range on the order of magnitude of milliseconds, so that one second wireless signal module 120 or first wireless signal module 130 can successively achieve a second wireless connection 320 or a first wireless connection 330 with many personal mobile terminals 200 in a short time, and many personal mobile terminals 200 can complete an elevator calling operation approximately simultaneously in a short time period.

The elevator system 100 or the movement determination apparatus 10 of the above embodiments can realize the completion of an automatic elevator calling operation in a completely hand free mode; for example, in the process from some passenger 90 entering the lobby of a building to reaching a target floor, he/she can take an elevator to the target floor without any operation as long as a personal mobile terminal 200 is carried thereby. As shown in FIG. 2, if the passenger 90 is moving towards the interior of the elevator car 110, when the distance from the personal mobile terminal 200 to the first wireless signal module 130-1 in the elevator car 110-1 is smaller than or equal to a first distance threshold, with the signal strength of the received first wireless signal changing from zero or relatively weak to equal to or greater than a relatively strong first pre-determined value, a first wireless connection 330 will be established and a target floor registration command will be automatically sent, the connection status information changes from "Off" to "On", and the elevator controller 140 will control the traveling of the elevator car 110-1 based on the target floor registration command, for example stopping at a floor corresponding to the target floor registration command. However, if the passenger 90 fails to enter the elevator car 110-1 when moving towards the interior of the elevator car 110-1 or temporarily changes his/her mind and leaves the elevator car 110-1 after entering it, or if the passenger 90 just walks by the landing door of the stopped elevator car 110-1, the personal mobile terminal 200 carried by the passenger 90 is likely to send a target floor registration command to the first wireless signal module 130 and automatically register a target floor for the passenger through the first wireless signal module 130; apparently, the target floor registration command may easily cause ineffective running of the elevator car 110-1, affecting the operation efficiency of the elevator system 100.

In the movement determination apparatus 10 and the movement determination method thereof according to the embodiments of the present invention, a determination result of the movement of the passenger relative to the elevator car 110 can be sent to the elevator system 100 at the same time. In the elevator system 100 of one embodiment of the present invention, the above-mentioned determination result can be sent to the elevator controller 140. For example, when it is determined that the passenger 90 has failed to move into the elevator car 110 or has failed to take the elevator, the personal mobile terminal 200 is generally still located in the elevator landing area 410; therefore, by means of a wireless communication module 210 of the personal mobile terminal 200, a wireless connection can be actively established with the second wireless signal module 120, and the determination result can be sent to the elevator controller 140. Similarly, when it is determined that the passenger 90 has successfully moved into the elevator car 110 and has successfully taken the elevator, the personal mobile terminal 200 must be located in the elevator car 110; therefore, by means of the wireless communication module 210 of the personal mobile terminal 200, a first wireless connection can be actively established with the first wireless signal module 130, and the determination result can be sent to the first wireless signal module 130 and then transferred to the elevator controller 140. The elevator controller 140 is further configured to select a determination result sent from the movement determination apparatus 10 about the movement of the passenger 90 relative to the elevator car 110 as a judgement condition, to judge whether to cancel a target floor registration command which is registered in the elevator car 110 and corresponds to the personal mobile terminal 200 of the passenger 90. By way of examples, the personal mobile terminal 200 of the passenger 90 automatically sends a target floor registration command corresponding to floor M to a first wireless signal module 130-1 of the elevator car 110-1, and when the elevator controller 140 acknowledges that the passenger 90 has successfully moved into the elevator car 110-1 and has successfully taken the elevator, the elevator controller 140 will not cancel the target floor registration command for the floor M, and the elevator car 110-1 will stop at the Mth floor; when the elevator controller 140 acknowledges that the passenger 90 has failed to move into the elevator car 110-1 or has failed to take the elevator, the elevator controller 140 will judge, by taking the determination result into consideration, whether to cancel the target floor registration command for the floor M. For example, when no other passenger registers the target floor registration command for the floor M, the stop of the elevator car 110-1 at the Mth floor will be canceled. For example, when no other passenger enters the elevator car 110-1, the traveling of the elevator car 110-1 from the current floor to the Mth floor will be canceled.

It should be understood that the condition for the elevator controller 140 to judge whether to cancel the target floor registration command corresponding to the passenger 90 is not limited to the condition of the determination result sent over from the personal mobile terminal 200, but can also include many other conditions as judgement factors, for example, the target floor registration command corresponding to other passengers, the current operation situation of the elevator car, etc.

In yet another embodiment, the first wireless signal module 130 also broadcasts connection status information about a first wireless connection 330 between same and the personal mobile terminal 200, and if the above-mentioned first wireless connection 330 is automatically established, then the connection status information corresponds to "On", otherwise the connection status information corresponds to "Off"; the wireless communication module 210 of the personal mobile terminal 200 will receive the connection status information; for example, when the personal mobile terminal 200 is located in the elevator landing area 410, the connection status information received thereby corresponds to "Off"; and in the process of the personal mobile terminal moving to the elevator car 110-1, there is a certain moment or time period where the connection status information received thereby corresponds to "On" (which is used for sending a target floor registration command at this time); and in the process of the elevator car 110-1 closing the landing door and operating, the connection status information received by the personal mobile terminal 200 of the passenger 90 therein corresponds to "Off". Therefore, the process of the passenger 90 walking into the elevator car 110-1 from the elevator landing area 410 generally corresponds to the process of the connection status information changing from "Off" to "On".

Therefore, in one embodiment, the personal mobile terminal 200 or the movement determination module 250 thereof is configured to: determine that the passenger 90 has successfully moved into the elevator car 110 and has successfully taken the elevator when the connection status information about the first wireless connection 330 received thereby changes from "Off" to "On" and the traveling direction information in the first wireless signal received thereby after the change changes from "not traveled" to "traveling upwards" or "traveling downwards". The personal mobile terminal 200 or the movement determination module 250 thereof is further configured to: determine that the passenger 90 has failed to move into the elevator car 110 or has failed to take the elevator when the connection status information about the first wireless connection 330 received thereby changes from "Off" to "On" and the traveling direction information in the first wireless signal received thereby after the change remains "not traveled" or disappears.

In yet another embodiment, the personal mobile terminal 200 or the movement determination module 250 thereof is configured to: determine that the passenger 90 has successfully moved into the elevator car 110 and has successfully taken the elevator when the connection status information about the first wireless connection 330 received thereby changes from "Off" to "On" and the first floor information in the first wireless signal received thereby after the change changes. The personal mobile terminal 200 or the movement determination module 250 thereof is further configured to: determine that the passenger 90 has failed to move into the elevator car 110 or has failed to take the elevator when the connection status information about the first wireless connection 330 received thereby changes from "Off" to "On" and the first floor information in the first wireless signal received thereby after the change does not change or disappears.

It will be understood that, in the above embodiments, based on the fundamental principle of establishing the first wireless connection 330, the connection status information about the first wireless connection 330 received by the personal mobile terminal 200 changing from "Off" to "On" is also caused by the change in the signal strength of the first wireless signal received by the personal mobile terminal 200; that is to say, it is a way of representing the signal strength changing from weak to strong.

It should be noted that the movement determination apparatus 10 and the movement determination method thereof according to the embodiments of the present invention are not limited to be the elevator system 100 capable of realizing elevator calling operations in a completely hand free mode in the above embodiments. For example, the movement determination apparatus 10 and the movement determination method thereof can also be applied in an elevator system which is based on another automatic elevator calling operation mode. In said another elevator calling operation mode, the personal mobile terminal can, once at the same time, automatically send or automatically input an elevator calling request command including an elevator calling direction and target floor information to the elevator system, and the elevator system will designate a corresponding elevator car (there are a plurality of elevator cars in the elevator system) for the passenger based on the command, and automatically register the target floor of the passenger in the elevator car. In such an elevator system, if the passenger has failed to move into the elevator car or has failed to take the elevator, then the problem that the designated elevator car ineffectively operates similarly exists, affecting the operation efficiency of the entire elevator system as well. The elevator controller 140 of such an elevator system can similarly be configured to: select a determination result sent over from the movement determination apparatus 10 about the movement of the passenger 90 relative to the elevator car 110 as a judgement condition, to judge whether to cancel a target floor registration command which is registered in the designated elevator car 110 and corresponds to the personal mobile terminal 200 of the passenger 90, thus avoiding the ineffective running of the designated elevator car 110.

Further, in order to determine whether the elevator car into which the passenger has moved is the corresponding designated elevator car, in one embodiment, the personal mobile terminal 200 or the movement determination module 250 thereof is further configured to: compare the traveling direction information in the first wireless signal received thereby with an elevator calling direction in an elevator calling request command sent by the personal mobile terminal 200, so as to determine whether the passenger has correspondingly moved into the designated elevator car. If the elevator calling direction in the elevator calling request command sent by the personal mobile terminal 200 does not correspond to the currently received traveling direction information, then it can be determined that the passenger 90 has failed to move into the designated elevator car.

By way of examples, as shown in FIG. 2, if the elevator car 110-2 is an elevator car designated by the elevator system based on the elevator calling request command of the passenger 90, and the target floor Y of the passenger 90 has been registered in the elevator car 110-2, a corresponding elevator calling direction is "upwards"; normally, the elevator car 110-2 will stop at the current floor of the passenger 90, and after the passenger 90 enters the elevator car 110-2, the elevator car 110-2 will automatically travel upwards to the Yth floor. However, there exists the situation where the passenger 90 enters the elevator car 110-1 by mistake when the elevator car 110-1 reaches and stops at the floor where the passenger 90 is currently located; at this time, the personal mobile terminal 200 will be able to receive traveling direction information, for example "traveling downwards", sent by the first wireless signal module 130-1 in the elevator car 110-1, and compare the traveling direction information with for example an "upward" elevator calling direction previously sent by the personal mobile terminal 200, so as to be able to determine that the passenger 90 has failed to move into the designated elevator car 110-2. Further, based on the determination result of failure, the wireless communication module 210 of the personal mobile terminal 200 is triggered to establish a wireless connection with the first wireless signal module 130-1 in the elevator car 110-1 and send the determination result of failure to the elevator controller 140; and based on the determination result of failure, the elevator controller 140 can automatically cancel the target floor registration command registered at the Yth floor in the designated elevator car 110-2. As such, the elevator car 110-2 will stop operating based on the above-mentioned normal way, avoiding ineffective operation.

As another alternative embodiment, the first wireless signal module 130 mounted in each elevator car also broadcasts identity information, e.g., a UUID, about the first wireless signal module 130 or the elevator car 110 on which it is mounted. The personal mobile terminal 200 or the movement determination module 250 thereof is further configured to: compare the identity information in the first wireless signal received thereby with identity information about the elevator car 110 which is designated for the personal mobile terminal 200, so as to determine whether the passenger 90 has correspondingly moved into the designated elevator car. The personal mobile terminal 200 or the movement determination module 250 thereof is further configured to: determine that the passenger 90 has failed to move into the designated elevator car 110 when the identity information in the first wireless signal received thereby is inconsistent with the identity information about the elevator car which is designated for the personal mobile terminal 200.

In the movement determination apparatus 10 or the elevator system 100 according to the above embodiments, the first wireless signal module 130 in each elevator car 110 can keep broadcasting a first wireless signal, and the first wireless signal comprises one or more of: first floor information, connection status information about the first wireless connection 330, traveling direction information, etc. It will be understood that these pieces of information are changing in real time. The personal mobile terminal 200 or the movement determination module 250 thereof can comprehensively determine the movement of the passenger 90 relative to the elevator car 110 based on the change in a plurality of: the first floor information, the connection status information about the first wireless connection 330 and the traveling direction information, and the determination result of the movement may be more accurate.

It will be understood that the "wireless connection" herein includes "wireless communication", for example, bluetooth communication based on a certain bluetooth protocol.

It will be understood that each block or combination of blocks in the block diagram of FIG. 3 can be implemented by computer program instructions, for example, by a dedicated APP. These computer program instructions can be provided to a processor of a general-purpose computer, of a special-purpose computer or of other programmable data processing devices to construct a machine, so that the processor of the computer or other programmable data processing devices executes these instructions to create a component for implementing a function/operation specified in the one or more block diagrams.

A person skilled in the art will understand that the aspects of the present invention can be embodied as a system, a method or a computer program product. Therefore, the aspects of the present invention can be in the following forms: a full-hardware implementation, a full-software implementation (including firmware, resident software, microcodes, etc.), or an implementation combining a software and hardware aspect which generally can all be called "services", "circuits", "circuitry", "modules" and/or "processing systems" herein. In addition, the aspects of the present invention can be in the form of a computer program product, in one or more computer readable mediums, on which computer readable program codes are implemented.

Any combination of one or more computer readable mediums can be used. The computer readable mediums can be computer readable signal mediums or computer readable storage mediums. The computer readable storage mediums can be, for example but not limited to, electronic, magnetic, optical, electromagnetic, infrared or semi-conductor systems, devices or apparatuses, or any suitable combination of the above. More specific instances (a non-exhaustive list) of the computer readable storage mediums include the following: an electric connection with one or more electric wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage apparatus, a magnetic storage apparatus, or any suitable combination of the above. In the context of the document, the computer readable storage medium can be any tangible medium that can contain or store instructions to be used by the instruction execution system, device or apparatus or combined therewith.

The program codes and/or executable instructions embodied on the computer readable medium can be transmitted with any appropriate medium, which includes but not limited to wireless, wired, fiber-optic cables, RF, etc., or any suitable combination of the above.

The computer program codes for implementing the operations of the aspects of the present invention can be written with any combination of one or more programming languages, including object-oriented programming languages such as Java, Smalltalk and C++, and traditional programming languages such as "C" programming language or similar programming languages. The program codes can be completely executed on a user's computer (apparatus), partially executed on a user's computer, executed as an independent software package, partially executed on a user's computer and partially executed on a remote computer, or completely executed on a remote computer or a server. In the later situation, the remote computer can be connected to the user's computer through any type of network including a local area network (LAN) or a wide area network (WAN) or can be connected to an external computer (for example, connecting through the Internet using an Internet service provider).

The computer program instructions can be provided to a processor of a general-purpose computer, a processor of a special-purpose computer such as an image processor or other programmable data processing devices to produce a machine, so that an approach for implementing a function/action specified in one or more blocks of the flowchart and/or block diagram is created via the instructions executed by the processor of the computer or other programmable data processing devices.

The computer program instructions can also be loaded onto a computer, other programmable data processing devices or other apparatuses, so as to execute a series of operation steps on the computer, other programmable data processing devices or other apparatuses, to generate a computer-implemented process, so that the instructions executed on the computer or other programmable devices provide a process for implementing the functions and actions specified herein.

It should also be noted that in some alternative implementation manners, the functions/operations shown in the blocks may not happen in the sequence shown in the flowchart. For example, two blocks that are successively shown can be executed substantially at the same time in fact, or these blocks sometimes can be executed in a reversed order, depending on the involved function/operation in particular. Although a specific step sequence is shown, disclosed and claimed, it should be understood that the steps can be implemented, separated or combined in any order, and will still benefit from the present disclosure, unless otherwise specified.

The present specification discloses the present invention with instances, including optimal modes, and also enables any person skilled in the art to practice the present invention, including fabricating and using any apparatus or system and executing any covered method. The scope of patent protection of the present invention is defined by the claims, and can include other instances conceived by a person skilled in the art. If such other instances have structural elements not different from the literal meaning of the claims, or if they include equivalent structural elements not substantially different from the literal meaning of the claims, then they are intended to be within the scope of the claims.

What is claimed is:

1. An automatic elevator calling system comprising:
a first wireless signal module mounted in an elevator car and used for broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled",
wherein the first wireless signal module is further used for receiving and determining information about the movement of a passenger relative to the elevator car, and the information about the movement is determined based on a change in the signal strength of the first wireless signal received by a personal mobile terminal carried by the passenger and a change in the first floor information and/or traveling direction information;
wherein the information about the movement comprises that the passenger has successfully moved into the elevator car and has successfully taken the elevator, which is determined in the following situation:
the signal strength of the received first wireless signal changes from zero or relatively weak to equal to or greater than a relatively strong first pre-determined value, and the traveling direction information in the received first wireless signal changes from "not traveled" to "traveling upwards" or "traveling downwards".

2. The automatic elevator calling system as claimed in claim 1, wherein the information about the movement comprises that the passenger has successfully moved into the elevator car and has successfully taken the elevator, which is determined in the following situation:
the signal strength of the received first wireless signal changes from zero or relatively weak to equal to or greater than a relatively strong first pre-determined value, and the first floor information in the first wireless signal received after the change changes.

3. The automatic elevator calling system as claimed in claim 1, wherein the first wireless signal module is used for automatically establishing a first wireless connection with the personal mobile terminal based on the first wireless signal, and receiving a target floor registration command sent over from the personal mobile terminal when establishing the first wireless connection.

4. The automatic elevator calling system as claimed in claim 3, wherein the first wireless signal further comprises connection status information about the first wireless connection, wherein when the signal strength of the first wireless signal received by the personal mobile terminal is equal to or greater than a first pre-determined value, it correspondingly indicates that a distance from the personal mobile terminal to the first wireless signal module is smaller than or equal to a first distance threshold, and the first wireless connection is automatically established and the connection status information changes from "Off" to "On".

5. The automatic elevator calling system as claimed in claim 4, wherein the information about the movement comprises that the passenger has successfully moved into the elevator car and has successfully taken the elevator, which is determined in the following situation:
the received connection status information about the first wireless connection changes from "Off" to "On", and the traveling direction information in the first wireless signal received after the change changes from "not traveled" to "traveling upwards" or "traveling downwards".

6. The automatic elevator calling system as claimed in claim 4, wherein the information about the movement comprises that the passenger has failed to move into the elevator car or has failed to take the elevator, which is determined in the following situation:
the received connection status information about the first wireless connection changes from "Off" to "On", and the traveling direction information in the first wireless signal received after the change remains "not traveled" or disappears.

7. The automatic elevator calling system as claimed in claim 4, wherein the information about the movement comprises that the passenger has successfully moved into the elevator car and has successfully taken the elevator, which is determined in the following situation:
the received connection status information about the first wireless connection changes from "Off" to "On", and the first floor information in the first wireless signal received after the change changes.

8. The automatic elevator calling system as claimed in claim 4, wherein the information about the movement comprises that the passenger has failed to move into the elevator car or has failed to take the elevator, which is determined in the following situation: the received connection status information about the first wireless connection changes from "Off" to "On", and the first floor information in the first wireless signal received after the change does not change or disappears.

9. The automatic elevator calling system as claimed in claim 3, wherein the system further comprises:
a second wireless signal module mounted in an elevator landing area, which is used for broadcasting a second wireless signal and automatically establishing a second wireless connection with the personal mobile terminal based on the second wireless signal, and receiving an elevator calling request command regarding an elevator calling direction sent over from the personal mobile terminal when establishing the second wireless connection.

10. The automatic elevator calling system as claimed in claim 1, wherein the first wireless signal module is further used for receiving movement result information about whether the passenger has correspondingly moved into a designated elevator car, and the movement result information is determined based on comparison of the traveling direction information in the first wireless signal received by the personal mobile terminal with the elevator calling direction in the elevator calling request command sent out by the personal mobile terminal.

11. The automatic elevator calling system as claimed in claim 10, wherein the movement result information is that the passenger has failed to move into the designated elevator car, which is determined in the following situation:
the traveling direction information in the received first wireless signal is inconsistent with the elevator calling direction in the elevator calling request command sent out by the personal mobile terminal.

12. The automatic elevator calling system as claimed in claim 1, wherein the first wireless signal further comprises identity information corresponding to the first wireless signal module or the elevator car on which it is mounted; and the first wireless signal module is further used for receiving movement result information about whether the passenger has correspondingly moved into a designated elevator car, and the movement result information is determined based on comparison of the identity information in the first wireless signal received by the personal mobile terminal with the identity information about the elevator car designated for the personal mobile terminal.

13. The automatic elevator calling system as claimed in claim 12, wherein the movement result information is that the passenger has failed to move into the designated elevator car, which is acquired in the following situation:
the identity information in the received first wireless signal is inconsistent with the identity information about the elevator car designated for the personal mobile terminal.

14. The automatic elevator calling system as claimed in claim 1, wherein the second wireless signal module and/or the first wireless signal module are/is bluetooth low energy modules/a bluetooth low energy module.

15. An automatic elevator calling system comprising:
a first wireless signal module mounted in an elevator car and used for broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled",
wherein the first wireless signal module is further used for receiving and determining information about the movement of a passenger relative to the elevator car, and the information about the movement is determined based on a change in the signal strength of the first wireless signal received by a personal mobile terminal carried by the passenger and a change in the first floor information and/or traveling direction information;
wherein the information about the movement comprises that the passenger has failed to move into the elevator car or has failed to take the elevator, which is determined in the following situation:
the signal strength of the received first wireless signal changes from zero or relatively weak to equal to or greater than a relatively strong first pre-determined value, and the traveling direction information in the first wireless signal received after the change remains "not traveled" or disappears.

16. An automatic elevator calling system comprising:
a first wireless signal module mounted in an elevator car and used for broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled",
wherein the first wireless signal module is further used for receiving and determining information about the movement of a passenger relative to the elevator car, and the information about the movement is determined based on a change in the signal strength of the first wireless signal received by a personal mobile terminal carried by the passenger and a change in the first floor information and/or traveling direction information;
wherein the information about the movement comprises that the passenger has failed to move into the elevator car or has failed to take the elevator, which is determined in the following situation:
the signal strength of the received first wireless signal changes from zero or relatively weak to equal to or greater than a relatively strong first pre-determined value, and the first floor information in the first wireless signal received after the change does not change or disappears.

17. An elevator system comprising:
an automatic elevator calling system comprising: a first wireless signal module mounted in an elevator car and used for broadcasting a first wireless signal, the first wireless signal being a data signal comprising first floor information about where the elevator car is currently located and/or current traveling direction information about the elevator car, wherein the traveling direction information comprises: "traveling upwards", "traveling downwards" and "not traveled",
wherein the first wireless signal module is further used for receiving and determining information about the movement of a passenger relative to the elevator car, and the information about the movement is determined based on a change in the signal strength of the first wireless signal received by a personal mobile terminal carried by the passenger and a change in the first floor information and/or traveling direction information; and
an elevator controller for controlling running of one or more elevator cars in the elevator system;
wherein the elevator controller is configured to judge, based on the information about the movement, whether to cancel a target floor registration command registered in the elevator car and corresponding to the personal mobile terminal of the passenger.

18. A method for determining the movement of a passenger relative to an elevator car, the method comprising:
receiving a first wireless signal, wherein the first wireless signal is broadcast from the elevator car and is a data signal comprising first floor information about where the elevator car is currently located and/or current traveling direction information about the elevator car, wherein the traveling direction information comprises: "traveling upwards", "traveling downwards" and "not traveled";
determining the signal strength of the received first wireless signal; and
determining the movement of the passenger relative to the elevator car based on a change in the signal strength of the received first wireless signal and the first floor information and a change in the first floor information and/or traveling direction information;
wherein in determining the movement, it is determined that the passenger has successfully moved into the elevator car and has successfully taken the elevator when the signal strength of the received first wireless signal changes from zero or relatively weak to equal to or greater than a relatively strong first pre-determined value and the traveling direction information in the received first wireless signal changes from "not traveled" to "traveling upwards" or "traveling downwards".

19. The method as claimed in claim 18, wherein in determining the movement, it is determined that the passenger has successfully moved into the elevator car and has successfully taken the elevator when the signal strength of the received first wireless signal changes from zero or relatively weak to equal to or greater than a relatively strong first pre-determined value and the first floor information in the first wireless signal received after the change changes.

20. The method as claimed in claim 18, wherein the signal strength of the first wireless signal changing from zero or relatively weak to equal to or greater than a relatively strong first pre-determined value refers to approximately gradually changing from zero or relatively weak to equal to or greater than the relatively strong pre-determined value.

21. The method as claimed in claim 18, wherein the first wireless signal further comprises connection status information about a first wireless connection used for sending a target floor registration command, wherein the first wireless connection is automatically established and the connection status information changes from "Off" to "On" when the signal strength of the received first wireless signal is equal to or greater than a first pre-determined value.

22. The method as claimed in claim 21, wherein in determining the movement, it is determined that the passenger has successfully moved into the elevator car and has successfully taken the elevator when the received connection status information about the first wireless connection changes from "Off" to "On" and the traveling direction information in the first wireless signal received after the change changes from "not traveled" to "traveling upwards" or "traveling downwards".

23. The method as claimed in claim 21, wherein in determining the movement, it is determined that the passenger has failed to move into the elevator car or has failed to take the elevator when the received connection status information about the first wireless connection changes from "Off" to "On" and the traveling direction information in the first wireless signal received after the change remains "not traveled" or disappears.

24. The method as claimed in claim 21, wherein in determining the movement, it is determined that the passenger has successfully moved into the elevator car and has successfully taken the elevator when the received connection status information about the first wireless connection changes from "Off" to "On" and the first floor information in the first wireless signal received after the change changes.

25. The method as claimed in claim 21, wherein in determining the movement, it is determined that the passenger has failed to move into the elevator car or has failed to take the elevator when the received connection status information about the first wireless connection changes from "Off" to "On" and the first floor information in the first wireless signal received after the change does not change or disappears.

26. The method as claimed in claim 18, further comprising: when it is determined that the passenger has failed to move into the elevator car or has failed to take the elevator, actively establishing a fourth wireless connection with a corresponding second wireless signal module mounted in an elevator landing area so as to send a determination result that the passenger has failed to move into the elevator car or has failed to take the elevator.

27. The method as claimed in claim 18, wherein in determining the movement, the traveling direction information in the received first wireless signal is compared with the elevator calling direction in an elevator calling request command sent out by the passenger, and if the traveling direction information in the received first wireless signal is inconsistent with the elevator calling direction in the elevator calling request command sent out by the passenger, it is determined that the passenger has failed to move into a designated elevator car.

28. The method as claimed in claim 18, wherein the first wireless signal further comprises identity information corresponding to the elevator car; and
in determining the movement, the received identity information is compared with identity information about a designated elevator car, and if the received identity information in the first wireless signal is inconsistent with the identity information about the designated elevator car, it is determined that the passenger has failed to move into the designated elevator car.

29. The method as claimed in claim 18, further comprising:
when it is determined that the passenger has failed to move into the elevator car or has failed to take the elevator, actively establishing a third wireless connection with a corresponding first wireless signal module so as to send a determination result that the passenger has failed to move into the designated elevator car.

30. A non-transitory computer readable storage medium with a computer program stored thereon, wherein the program can be executed by a processor to realize steps of the method as claimed in claim 18.

31. A method for determining the movement of a passenger relative to an elevator car, the method comprising:
receiving a first wireless signal, wherein the first wireless signal is broadcast from the elevator car and is a data signal comprising first floor information about where the elevator car is currently located and/or current traveling direction information about the elevator car, wherein the traveling direction information comprises: "traveling upwards", "traveling downwards" and "not traveled";
determining the signal strength of the received first wireless signal; and
determining the movement of the passenger relative to the elevator car based on a change in the signal strength of the received first wireless signal and the first floor information and a change in the first floor information and/or traveling direction information;
wherein in determining the movement, it is determined that the passenger has failed to move into the elevator car or has failed to take the elevator when the signal strength of the received first wireless signal changes from zero or relatively weak to equal to or greater than a relatively strong first pre-determined value and the traveling direction information in the first wireless signal received after the change remains "not traveled" or disappears.

32. A method for determining the movement of a passenger relative to an elevator car, the method comprising:
receiving a first wireless signal, wherein the first wireless signal is broadcast from the elevator car and is a data signal comprising first floor information about where the elevator car is currently located and/or current traveling direction information about the elevator car, wherein the traveling direction information comprises: "traveling upwards", "traveling downwards" and "not traveled";
determining the signal strength of the received first wireless signal; and
determining the movement of the passenger relative to the elevator car based on a change in the signal strength of the received first wireless signal and the first floor information and a change in the first floor information and/or traveling direction information;

wherein in determining the movement, it is determined that the passenger has failed to move into the elevator car or has failed to take the elevator when the signal strength of the received first wireless signal changes from zero or relatively weak to equal to or greater than a relatively strong first pre-determined value and the first floor information in the first wireless signal received after the change does not change or disappears.

* * * * *